Patented May 31, 1927.

UNITED STATES PATENT OFFICE.

CHESTER A. WILKINS, OF SACRAMENTO, CALIFORNIA, AND STANLEY D. WILKINS, OF ST. LOUIS, MISSOURI.

INSECTICIDE.

No Drawing.      Application filed February 4, 1924. Serial No. 690,657.

Our invention relates to an insecticide and is particularly adapted for the destruction of grasshoppers, army worms, cut worms and certain species of ground beetles. We have found that an effective insecticide for the purpose set forth is produced by mixing molasses, preferably of the grade known as "blackstrap" with a poison such as white arsenic, and a fruit flavoring, either natural or artificial. When liquid molasses is used, however, several difficulties are encountered. Owing to the viscosity of the molasses it is difficult to uniformly incorporate the arsenic therewith, and the stirring necessary to this operation causes a considerable amount of air to also become incorporated in the mass which air does not escape even when considerable time elapses between the stirring and the sealing of the container in which the mixture is shipped. This air expands when the temperature increases and the expansion is often sufficient to burst the container and scatter the contents. This not only causes considerable loss but is dangerous on account of the poisonous nature of the contents. Furthermore, uniform strength of mixture cannot well be maintained owing to the varying percentage of water in different lots of molasses. The large amount of water contained in the mixture when liquid molasses is used adds greatly to its bulk and weight and the consequent cost of shipment.

All the above objectionable features we overcome by using desiccated molasses in place of liquid molasses in preparing the compound. The formula which we have found best suited to our purpose is as follows:

Desiccated molasses _____ 4 pounds
White arsenic _____ 1 pound
Amyl acetate _____ ¾ ounce In place of the amyl acetate or similar artificial fruit flavoring, we may use a natural fruit flavoring such as citrus fruit pulp, in which case about one pound of pulp will be substituted for the amyl acetate.

This composition, the proportions of which may be accurately determined, can be shipped at comparatively small expense and will not explode in variations of temperature to which it is liable to be exposed during shipment. It is preferably prepared for and at or about time of use by being mixed with approximately ten pounds of water and stirred into twenty-five pounds of bran. Sufficient water is thus added to the bran mixture to form a crumbly mass. The amount of water thus added will usually be from five to six pounds, depending upon the amount of moisture contained in the bran used.

Having fully described our invention, what we claim as new and desire to secure by Letters Patent of the United States is:

1. A composition of matter for insecticide purposes, the same comprising as its chief ingredients desiccated molasses and a poison.
2. A composition of matter for insecticide purposes, the same being substantially in the form of a powder and comprising as ingredients desiccated molasses and a poison.
3. A composition of matter for insecticide purposes, the same being substantially in the form of a powder and comprising as ingredients desiccated molasses and an arsenious poison.
4. A composition of matter for insecticide purposes, the same being substantially in the form of a powder and comprising as ingredients desiccated molasses, an arsenious poison, and a fruit flavor.
5. A composition of matter for insecticide purposes, the same being substantially in the form of a powder and comprising as ingredients desiccated molasses, an arsenious poison, and a fruit flavor in substantially the proportions stated.
6. An insecticide comprising as constituent elements desiccated molasses, an arsenious poison, bran, and water.

CHESTER A. WILKINS.
STANLEY D. WILKINS.